United States Patent
Gluhovsky

(10) Patent No.: US 7,096,178 B2
(45) Date of Patent: Aug. 22, 2006

(54) ISOTONIC ADDITIVE MODELS IN WORKLOAD CHARACTERIZATION

(75) Inventor: Ilya Gluhovsky, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 779 days.

(21) Appl. No.: 10/190,958

(22) Filed: Jul. 8, 2002

(65) Prior Publication Data

US 2004/0006452 A1 Jan. 8, 2004

(51) Int. Cl.
*G06F 9/45* (2006.01)
(52) U.S. Cl. .................................................... 703/22
(58) Field of Classification Search ............... 711/118; 703/2, 21
See application file for complete search history.

(56) References Cited

OTHER PUBLICATIONS

Dykstra et al. "An Algorithm for Isotonic Regression for Two or More Independent Variables".*
Thiebaut et al. "Improving Disk Cache Hit-Ratios Though Cache Partitioning".*
"Modeling Under Order Restrictions" G. Salanti, K. Ulm. Technical University of Munich. Dec. 3, 2001.*
"Applied Nonparametric Regression" Chapter 8.1, "Monotonic and Unimodal Smoothing", Wolfgang Herdle, Andrew Chester. 1992.*
"Measurement and Analysis of Workload Effects on Fault Latency in Real Time Systems", Woodbury et al. Feb. 1990. IEEE. pp. 212-216.*
Peter Bacchetti; "*Additive Isotonic Models*;" Journal of the American Statistical Association, Mar. 1989, pp. 289-294; vol. 84, No. 405; Theory and Methods.
Richard L. Dykstra and Tim Robertson; "*An Algorithm For Isotonic Regression For Two Or More Independent Variables*;" pp. 708-716; 1982, vol. 10, No. 3, The Annuals of Statistics, Department of Statistics and Actuarial Science, University of Iowa, Iowa City, IA, USA.

* cited by examiner

*Primary Examiner*—Hugh Jones
*Assistant Examiner*—Saif Alhija
(74) *Attorney, Agent, or Firm*—Osha Liang LLP

(57) ABSTRACT

A method for modeling a system configuration, including isotonizing an unconstrained additive model of a cache architecture to obtain an isotonic additive model for the cache architecture, wherein the isotonic additive model is of the same functional form as the unconstrained additive model, smoothing the isotonic additive model using a flat spot technique to obtain a characterization of the cache architecture, and modeling a system configuration using the characterization of the cache architecture.

20 Claims, 6 Drawing Sheets

ISOTONIC ADDITIVE MODELS IN WORKLOAD CHARACTERIZATION

BACKGROUND ART

Generally, a microprocessor operates much faster than main memory can supply data to the microprocessor. Therefore, many computer systems temporarily store recently and frequently used data in smaller, but much faster cache memory. There are many levels of cache, e.g., level one (L1), level two (L2), level three (L3), etc. L1 cache typically is closest to the processor, smaller in size, and faster in access time. Typically, as the level of the cache increases (e.g., from L1 to L2 to L3), the level of cache is further from the microprocessor, larger in size, slower in access time, and supports more microprocessors.

Referring to FIG. 1 and FIG. 2, a typical parallel processing computer system includes boards (20A–20N) connected to a L3 cache (22), i.e., an external cache memory. Each board (20A–20N) has, among other things, chips (14A–14N) and a L2 cache (18), i.e., an on-board cache L3 cache (22) is connected to a main memory (24). Main memory (24) holds data and program instructions to be executed by the microprocessor (8). Microchips (14A–14N) include microprocessors (8A–8N) that are associated with L1 cache (12A–12N), i.e., an on-chip cache memory. In addition to the microprocessors (8A–8N), virtual microprocessors (not depicted) may also use the L1 cache (12A–12N). Virtual microprocessors are considered threads or placeholders for current processes associated with microprocessors (8A–8N). One skilled in the art can appreciate that L1 cache may be associated with multiple microprocessors rather than accessed by a single microprocessor as depicted in FIG. 2.

Program instructions that are usually stored in main memory are physical operations given by a program to the microprocessor (8A–8N), e.g., specifying a register or referencing the location of data in cache memory (either L1 cache (12), L2 cache (18), or L3 cache (22)). A sequence of program instructions linked together is known as a trace. The program instructions are executed by the microprocessor (8A–8N). Each program instruction is fetched by a memory controller (not shown). Upon command from one of the microprocessors (14A–14N), the memory controller searches for data, such as the program instruction, first in the L1 cache (12A–12N). If the data is not found in the L1 cache (12A–12N), the memory controller next searches the L2 cache (18). If the data is not found in the L2 cache (18), the memory controller then searches the L3 cache (22). If the data is not found in the L3 cache (22), the memory controller finally searches the main memory (24). Once the data is found, the memory controller returns the data to the microprocessor that issued the command. If the data is not found, an error message is returned to the microprocessor that issued the command.

One skilled in the art can appreciate that the architecture of the cache may be structured in a variety of ways, e.g., the architectural components may include cache hierarchy, cache size, cache line size, cache associativity, cache sharing, and cache write type may be designed in a number of ways.

Cache hierarchy refers to the different levels of memory, i.e., L1 cache, L2 cache, etc., that take advantage of the "principle of locality". The "principle of locality" asserts that most programs do not access data uniformly. Thus, the cache hierarchy may be designed using different types of cache memories (i.e., faster more expensive cache memory or slower less expensive cache memory) in conjunction with the "principle of locality" to improve computer system performance. As mentioned above, L1 cache is typically located on the same chip as the microprocessor while, in contrast, L2 cache is typically located on the same board as the microprocessor. Further, L2 cache is typically larger in size and has a slower access time than L1 cache.

Cache size refers to the total size of the cache memory. The cache memory is configured to store data in discrete blocks in the cache memory. A block is the minimum unit of information within each level of cache. The size of the block is referred to as the cache line size. The manner in which data is stored in the blocks is referred to as cache associativity. Cache memories typically use one of the following types of cache associativity: direct mapped (one-to-one), fully associative (one to all), or set associative (one to set).

Cache sharing of cache refers to the manner in which data in the blocks are shared. Specifically, cache sharing is the number of processors (physical or virtual) sharing one L1 cache, the number of L1 caches sharing one L2 cache, and the number of L2 caches sharing one L3 cache, etc. Most program instructions involve accessing (reading) data stored in the cache memory; therefore, the cache associativity, cache sharing, cache size, and cache line size are particularly significant to the cache architecture.

Likewise, writing to the cache memory (cache write type) is also critical to the cache architecture, because the process of writing is generally a very expensive process in terms of process time. Cache memory generally uses one of the following methods when writing data to the cache memory: "write through, no-write allocate" or "write back, write allocate".

In a parallel processing computer system, the issue of cache coherency is raised when writing to the cache memory that is shared by many processors. Cache coherency resolves conflicts in multiple processors accessing and writing (or changing) the value of variables stored in the same cache memory. The following protocols are typically used to resolve cache coherency issues: Modified Shared Invalid (MSI), Modified Exclusive Shared Invalid (MESI), Modified Owner Shared Invalid (MOSI), Modified Owner Exclusive Shared Invalid (MOESI), etc. One skilled in the art can appreciate the particular aspects of these protocols and that other protocols can be used to resolve cache coherency issues.

The performance of the cache architecture is evaluated using a variety of parameters, including a miss rate, a hit rate, an instruction count, an average memory access time, etc. The miss rate is the fraction of all memory accesses that are not satisfied by the cache memory. In contrast, the hit rate is the fraction of all memory accesses that are satisfied by the cache memory. The instruction count is the number of instructions processed in a particular amount of time. The average memory access time is the amount of time on average that is required to access data in a block of the cache memory.

SUMMARY OF INVENTION

In general, in one aspect, the invention relates to a method for modeling a system configuration, comprising isotonizing an unconstrained additive model of a cache architecture to obtain an isotonic additive model for the cache architecture, wherein the isotonic additive model is of the same functional form as the unconstrained additive model, smoothing the isotonic additive model using a flat spot technique to obtain a characterization of the cache architecture, and modeling a system configuration using the characterization of the cache architecture.

In general, in one aspect, the invention relates to a computer-readable medium having recorded thereon instructions executable by a processor to perform a cache architecture simulation, the instructions for isotonizing an unconstrained additive model of a cache architecture to obtain an isotonic additive model for the cache architecture, wherein the isotonic additive model is of the same functional form as the unconstrained additive model, smoothing the isotonic additive model using a flat spot technique to obtain a characterization of the cache architecture, and modeling a system configuration using the characterization of the cache architecture.

In general, in one aspect, the invention relates to a computer system for cache architecture simulation, comprising a processor, a memory, a display device, and software instructions stored in the memory for enabling the computer system under control of the processor, to perform: isotonizing an unconstrained additive model of a cache architecture to obtain an isotonic additive model for the cache architecture, wherein the isotonic additive model is of the same functional form as the unconstrained additive model, smoothing the isotonic additive model using a flat spot technique to obtain a characterization of the cache architecture, and modeling a system configuration using the characterization of the cache architecture.

Other aspects and advantages of the invention will be apparent from the following description and the appended claims.

DETAILED DESCRIPTION

Figure 1:
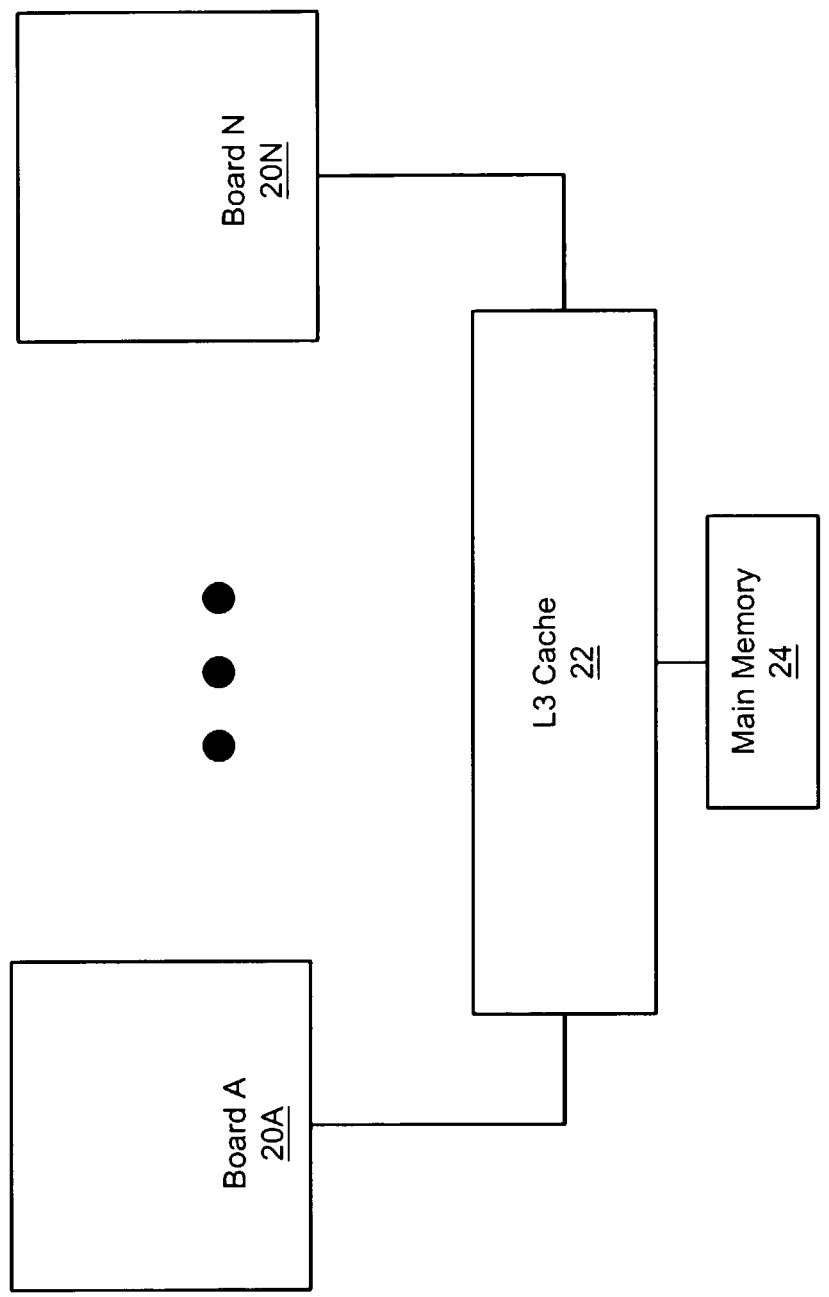
FIG. 1 shows the arrangement of memory components within a typical parallel processing computer system.
Figure 2:
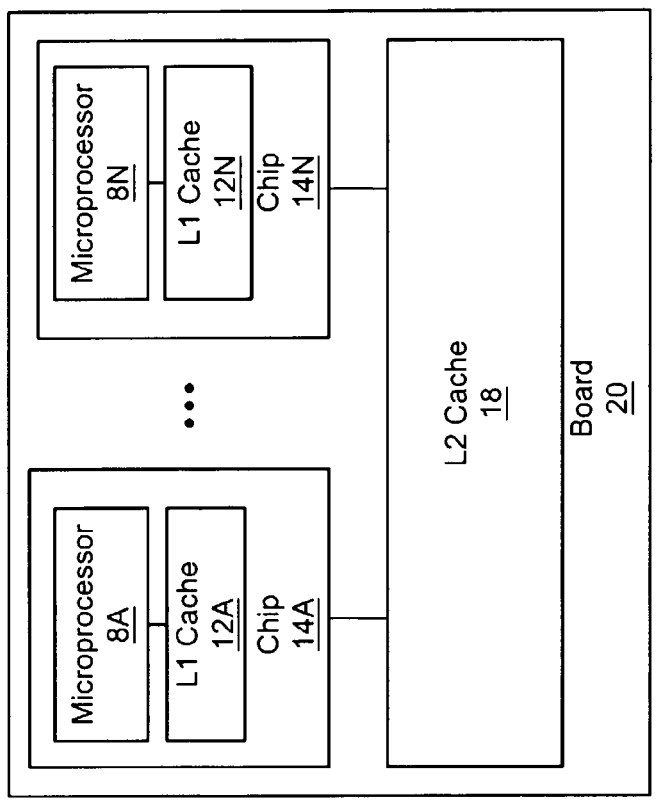
FIG. 2 shows the arrangement of memory components within a board of a typical parallel processing computer system.

Exemplary embodiments of the invention will be described with reference to the accompanying drawings. Like items in the drawings are denoted by the same reference numbers throughout the figures for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Simulation is a useful tool in determining the performance of the cache architecture. Given workload traces (i.e., a set of traces that are executed by the microprocessors that emulate sets of typical instructions) and the cache architecture, the performance, e.g., hit/miss rates, of that cache architecture may be simulated. For a given set of cache architectural components, including a range of possible values for each cache architectural component, the number of permutations to fully simulate the cache architecture is very large. There are additional constraints when using simulation. For example, a trace for each processor is required. However, some traces may be absent or short traces that provide realistic scenarios do not sufficiently "warm-up" large cache sizes, i.e., a trace may not be long enough for the simulation to reach steady-state input rates. In the interest of time and cost, typically only a small sample set of cache architectures is simulated.

Statistical analysis is then used to estimate the performance of the cache architectures that are not simulated. Statistical analysis involves mapping a set of explanatory variables to a response variable. With regard to a cache architecture, explanatory variables may be cache size, cache line size, cache associativity, etc. Moreover, an example of a response variable is a miss rate. Models are typically used to relate the explanatory variables to the response variable.

An additive model assumes each explanatory variable contributes to the response variable as an additive component. Additive models are particularly useful in modeling relationships between variables complex in form, i.e., not easily fitted by standard linear or non-linear models, or modeling a priori.

An isotonic additive model is a particular additive models that is monotonic, specifically non-decreasing. Therefore, isotonic additive models may be used to model the performance of a cache architecture, in so far as, monotonicity is a valid assumption for measures of cache performance. In other words, the conditional expectancy (i.e., the expectation of a particular outcome given a set of circumstances) of a measure of cache performance decreases given a decrease in one of the architectural components, e.g., miss rates decreases given a decrease in cache size. The isotonic additive model is typically generated by isotonizing a set of data. Isotonizing generally minimizes an explicit criterion. The explicit criterion may be a measure of the amount of disagreement between the data and the observed outcome using the model generated by the isotonic transformation.

Figure 3:
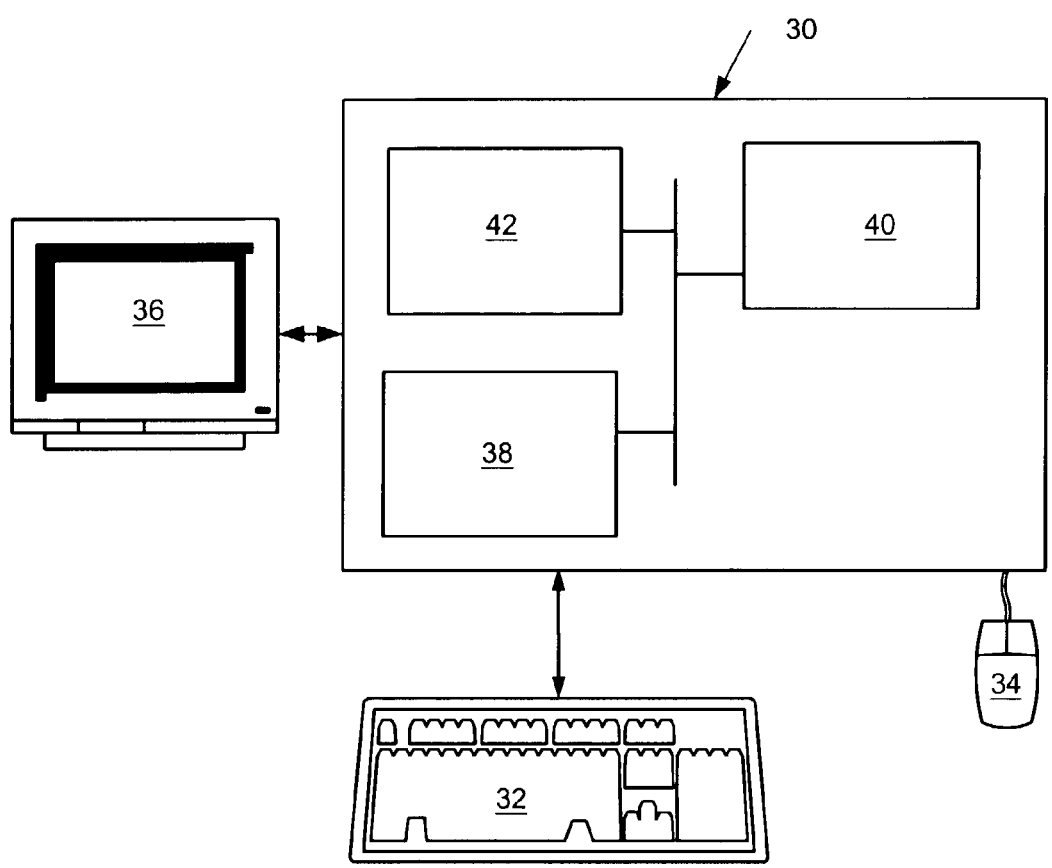
FIG. 3 shows a typical networked computer system.

The invention may be implemented on virtually any type of computer regardless of the platform being used. For example, as shown in FIG. 3, a typical network computer system (30) includes a processor (40), associated memory (42), a storage device (38), and numerous other elements and functionalities typical of today's computers (not shown). The computer (30) may also include input means, such as a keyboard (32) and a mouse (34), and output means, such as a display device (36). One skilled in the art can appreciate that these input and output means may take other forms in an accessible environment.

Figure 4:
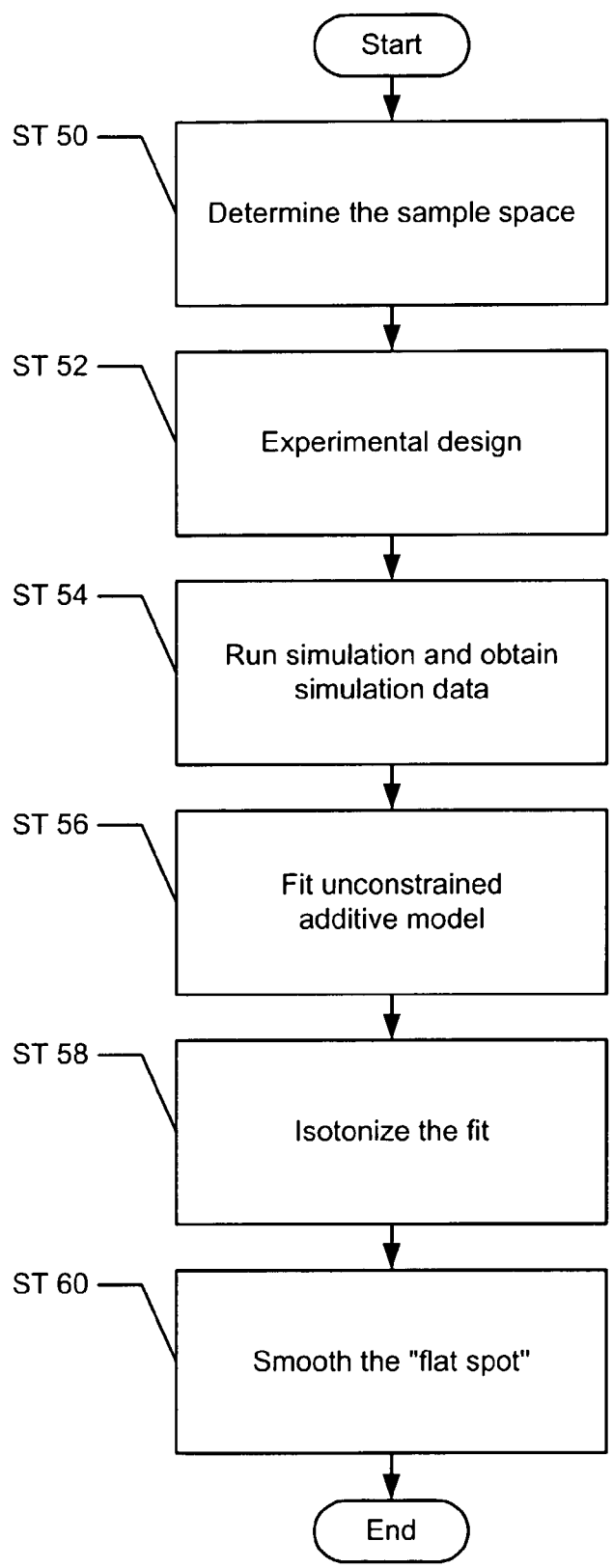
FIG. 4 shows a flow chart of a process for characterizing cache architecture in accordance with one embodiment of the invention.

FIG. 4 shows a flow chart of a process for characterizing cache architecture in accordance with one embodiment of the invention. Characterizing the cache architecture typically includes, but is not limited to, determining performance measurements (i.e., cache hit rates, miss rates, etc.) for a given cache architecture. In designing a cache architecture, a computer designer may determine a sample space of the cache architecture of interest, i.e., a set of cache architecture components and ranges (Step 50). The following chart is an example of a sample space of a cache architecture determined by a computer designer:

TABLE 1

Sample Space of Cache Architecture 1

| Architectural Component | L1 Cache | L2 Cache |
|---|---|---|
| Cache Size | 16 KB–256 KB | 1 MB–16 MB |
| Cache Line Size | 32 B–128 B | 32 B–128 B |
| Cache Associativity | 1 to 8 way | 1 to 8 way |
| Cache Sharing | 1 to 128 way | 1 to 128 way |
| Cache Write Type | Write back/write through | write back/write through |
| Cache Coherence Protocol | MOSI | MOSI |
| Number of Microprocessors | 1 to 4 | 1 to 128 |

Table 1 shows various architectural components and corresponding cache architectural component ranges for a two-level cache hierarchy. The total cache size, cache line size, cache associativity, cache sharing, cache write type, and cache coherency protocol along with their values or respective ranges are provided.

The computer designer may perform additional experimental design procedures using the sample space (Step 52). For example, an experimental design procedure may include preliminary experiments where simulations are performed uniformly over the sample space of the cache architecture of interest, e.g., Cache Architecture 1. Executing the preliminary experiments allows a set of preliminary cache data to be generated. A probabilistic sample set is derived from the preliminary cache data. A workload trace for the cache architecture of interest, e.g., Cache Architecture 1, may also be determined as part of the experimental design procedure.

A simulation is run using the probabilistic sample set and the workload trace to generate a set of simulation data (Step 54). Various simulations may be used including instruction simulations, bus-trace simulations, and execution-driven simulations, etc. The simulation data generated may be a set of data pairs, e.g., $(\underline{x}_1, y_1)$, where $\underline{x}_i$ is a multi-dimensional vector. In one or more embodiments of the invention, the multi-dimensional vector $\underline{x}$ is a vector of the cache architectural components, e.g., $\underline{x}=[x_1=$cache size, $x_2=$cache associativity, $x_3=$cache line size] ($x_1$, $x_2$, and $x_3$ are also referred to as explanatory variables), and the response variable, y, is a read miss rate. In the example previously described, only a portion of the Cache Architecture 1 is simulated, namely the cache size, cache associativity, and the cache line size. One skilled in the art can appreciate that the vector $\underline{x}$ may be of a higher dimension and include a variety or cache architectural components.

An unconstrained additive model is fit to the data pairs (Step 56). In one or more embodiments of the invention, an unconstrained bivariate model is fitted to the data pairs. A bivariate model analyzes one variable contingent on the value of another variable. An example of the unconstrained bivariate additive model may have the following form:

$$\hat{g}(x_1,x_2,x_3)=\hat{g}_{1,2}(x_1,x_2)+\hat{g}_{2,3}(x_2,x_3) \quad (1).$$

Equation 1 shows a function g with two additive components. A first additive component, $g_{1,2}$, that models the interaction between the cache size and the cache associativity. A second additive component, $g_{2,3}$, that models the interaction between the cache associativity and the line size. Furthermore, each function g in Equation 1 may be expressed as a conditional expectancy, i.e., the likelihood of producing a particular read miss rate given a set of architectural component values. The conditional expectancy for each function of g may be expressed as follows:

$$\hat{g}(x_1, x_2, x_3)=E(y|x_1, x_2, x_3) \quad (2)$$

$$g_{1,2}(x_1,x_2)=E(y-g_{2,3}(x_2,x_3)|x_1,x_2) \quad (2.1)$$

$$g_{2,3}(x_2,x_3)=E(y-g_{1,2}(x_1,x_2)|x_2,x_3) \quad (2.2)$$

Equations 2, 2.1, and 2.2 all express similar relationships. Equation 2.1, for example, provides the miss rate given the cache size is 32 KB and the cache associativity is 1 to 2. Further Equation 2.2 provides the miss rate given the cache associativity is 1 to 2 and the cache line size is 32 B. Equation 2 is the sum of the miss rates from Equation 2.1 and 2.2, and thus, provides the miss rate given the cache size is 32 KB, the cache associativity is 1 to 2, and the cache line size is 32 B.

Referring back to FIG. 4, the computer designer isotonizes the unconstrained additive model (Step 58). Isotonizing produces an isotonic model of the same functional form as the unconstrained additive model. Equation 3 shows the isotonization of Equation 1 as follows:

$$\hat{h}=Iso(\hat{g}(x_1,x_2,x_3))=\hat{h}_{1,2}(x_1,x_2)+\hat{h}_{2,3}(x_2,x_3) \quad (3),$$

where Iso is the isotonizing process that is an iterative procedure where the pool-adjacent violators algorithm is applied to each additive component for every explanatory variable. Equation 1 is isotonized so that the resulting isotonic additive model, Equation 3, is of the same functional form as the unconstrained additive model, Equation 1.

Figure 5:
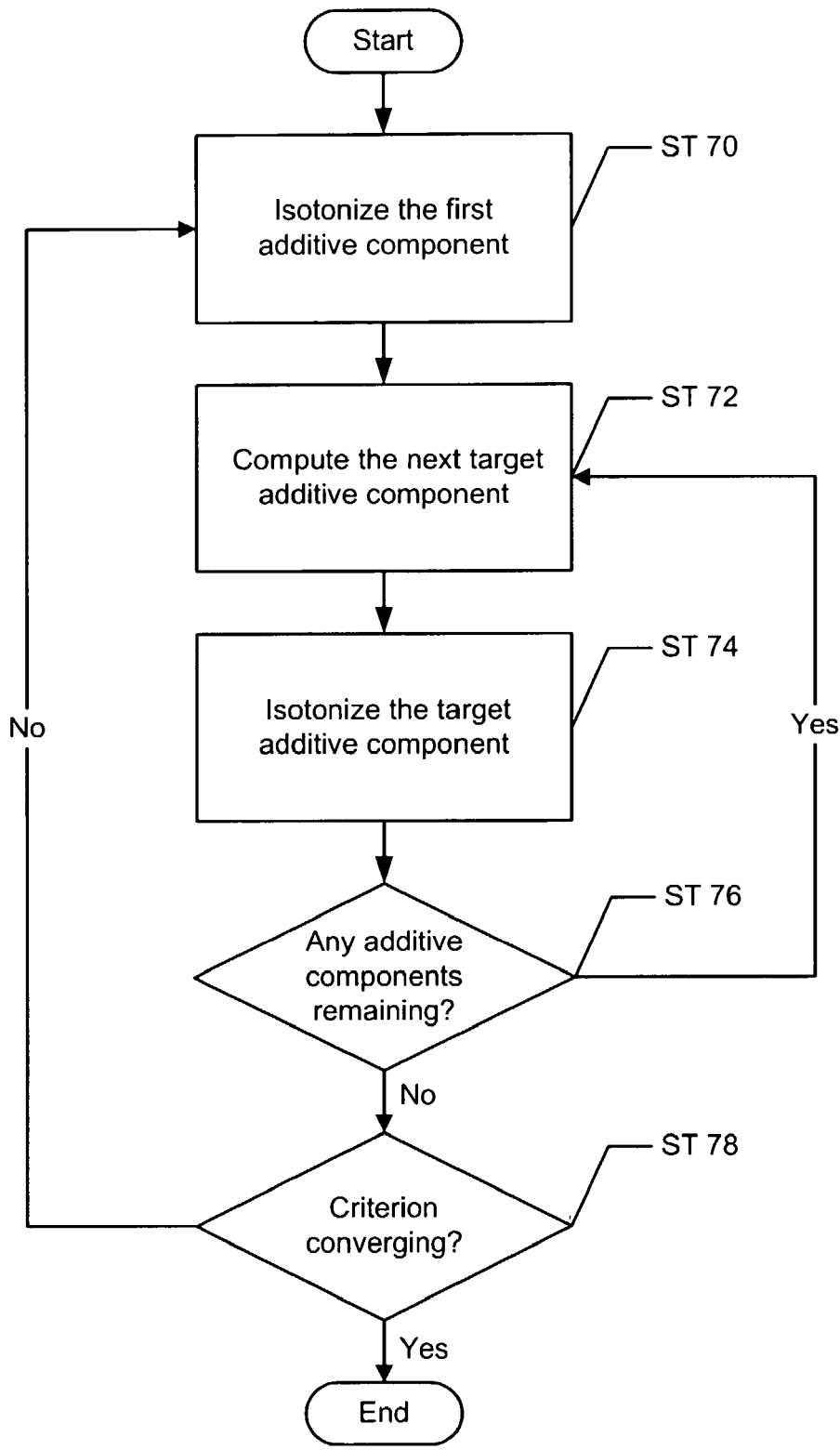
FIG. 5 shows a flow chart of a process for isotonizing an unconstrained additive model in accordance with one or more embodiments of the invention.

FIG. 5 shows a flow chart of a process for isotonizing an unconstrained additive model in accordance with one or more embodiments of the invention. The process of isotonizing begins by assuming $h_{1,2}=h_{2,3}=0$ and isotonizing the first additive component (Step 70).

Equation 4 provides an example of applying the isotonizing function to the first additive component of Equation 1:

$$h_{1,2}^{(1)} = Iso\left\{\hat{g}_{1,2}(x_1, x_2) + \frac{\sum_{x_3} \hat{g}_{2,3}(x_2, x_3)}{\#x_3} - \frac{\sum_{x_3} \hat{h}_{2,3}(x_2, x_3)}{\#x_3} \Big| x_1, x_2\right\}. \quad (4)$$

In Equation 4, the first additive component is isotonized by adding the average contribution of the second additive component of the unconstrained additive model (Equation 1) along the explanatory variable of cache line size, and subtracting the average of the second additive component of the isotonic additive model (Equation 3) along the explanatory variable of the cache line size, given a particular cache size and cache associativity. Adding the average of the second additive component of the unconstrained additive model, $g_{2,3}$, along $x_3$ (where $\#x_3$ is the number of $x_3$ values summed over), the average of $g_{2,3}$ is a function of $x_2$. Further, subtracting the average of the second additive component of the isotonic additive model, $h_{2,3}$, along $x_3$ (where $\#x_3$ is the number of $x_3$ values summed over), the average of $h_{2,3}$ is a function of $x_2$.

In Step 72, the next target additive component is computed. Then, the target additive component is isotonized (Step 74). The next target additive component, in the present example, is the second additive component. Equation 5 provides an example of computing and applying the isotonizing function to the second additive component of Equation 2 using the isotonized first additive component.

$$h_{2,3}^{(1)} = Iso\left\{\hat{g}_{2,3}(x_2, x_3) + \frac{\sum_{x_1} \hat{g}_{1,2}(x_1, x_2)}{\#x_1} - \frac{\sum_{x_1} h_{1,2}^{(1)}(x_1, x_2)}{\#x_1} \mid x_2, x_3\right\}. \quad (5)$$

If there are additional additive components (Step 76), then the next target additive component is computed (Step 72). Otherwise, if the optimization criterion used by the isotonizing algorithm converges (Step 78), then the unconstrained additive model has been isotonized and the isotonic additive model has been generated.

In the present example, if the optimization criterion converges, then the following isotonic additive model results:

$$\bar{h}(x_1,x_2,x_3) = \bar{h}_{1,2}(x_1,x_2) + \bar{h}_{2,3}(x_2,x_3) \quad (6).$$

In other words, as the optimization criterion converges, the respective additive components converge to the isotonic additive model of interest. The following may be expressed as:

$$h'_{1,2} \to \bar{h}_{1,2} \quad (6.1)$$

$$h'_{2,3} \to \bar{h}_{2,3} \quad (6.2),$$

where i is the number of iterations, such that the optimization criterion converges. Otherwise, if the optimization criterion does not converge, the first additive component is isotonized again using the "newly" computed additive components (Step 70).

In the present example, there are only two additive components and an assumption is made that the optimization criterion has not converged. In this case, Step 70 is revisited and is shown in Equation 7:

$$h_{1,2}^{(2)} = Iso\left\{\hat{g}_{1,2}(x_1, x_2) + \frac{\sum_{x_3} \hat{g}_{2,3}(x_2, x_3)}{\#x_3} - \frac{\sum_{x_3} h_{2,3}^{(1)}(x_2, x_3)}{\#x_3} \mid x_1, x_2\right\}. \quad (7)$$

In Equation 7, the isotonized additive component of the previous iteration is used. Therefore, (2) indicates the second isotonization for the first additive component $h_{1,2}$. The isotonizing process continues until the optimization criterion converges. One skilled in the art can appreciate that the isotonized additive components, e.g., $h_{1,2}$ and $h_{2,3}$, are not uniquely defined as there is a function $a(x_2)$ such that, $$\bar{h}(x_1,x_2,x_3) = \bar{h}_{1,2}(x_1,x_2) - a(x_2) + \bar{h}_{2,3}(x_2,x_3) + a(x_2) \quad (8),$$

defines the same isotonic additive model in Equation 3. Thus, there are many isotonic additive models for a particular unconstrained additive model.

Figure 6:
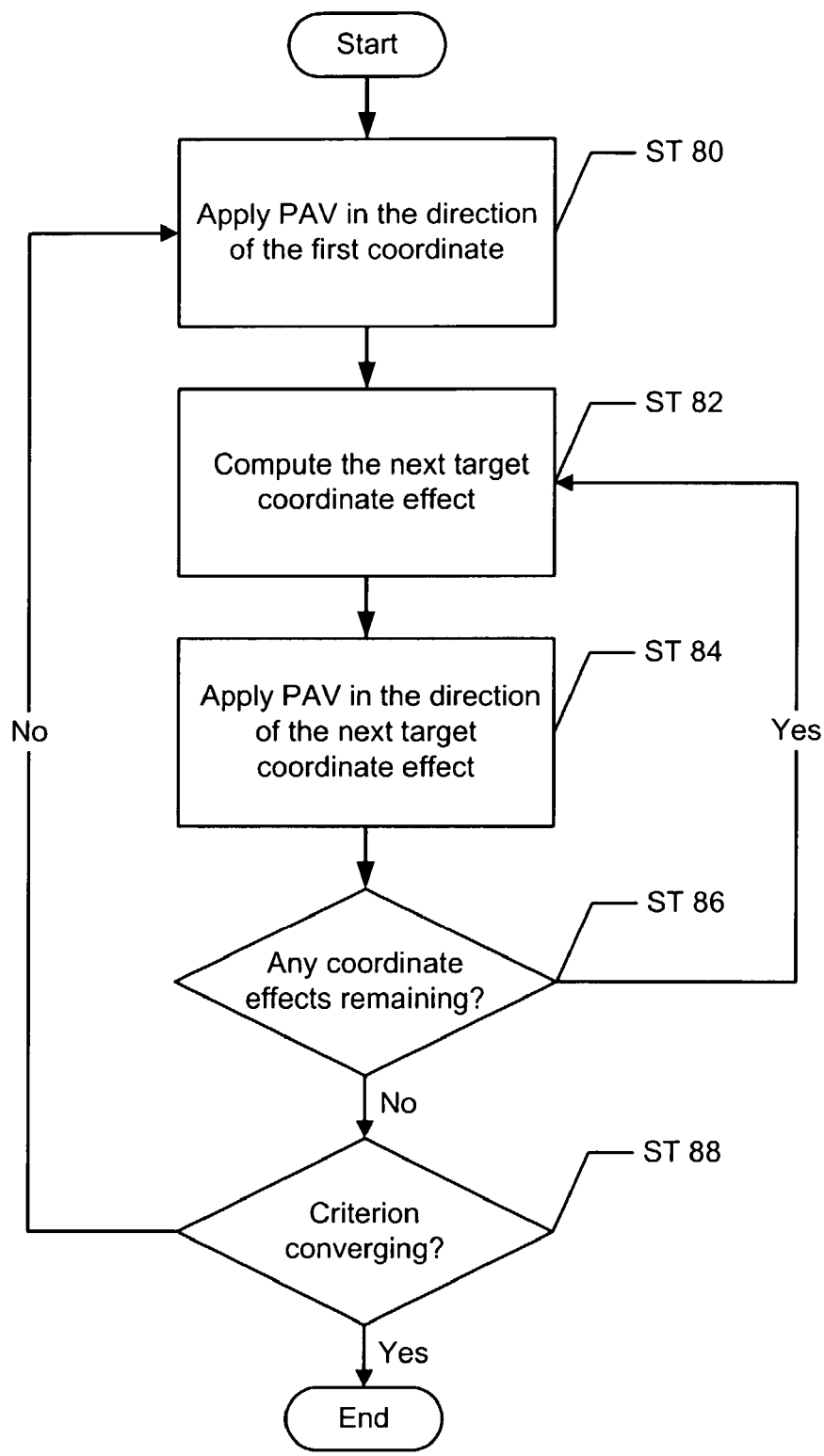
FIG. 6 shows a flow chart of a process for applying a pool-adjacent violators algorithm in accordance with one or more embodiments of the invention.

FIG. 6 shows a flow chart of a process for applying a pool-adjacent violators algorithm in accordance with one or more embodiments of the invention. The pool-adjacent violators (PAV) algorithm minimizes the optimization criterion between the unconstrained additive model and the isotonic additive model for each additive component. Therefore, for each additive component, the PAV is applied in the direction of each explanatory variable (also termed coordinate effect). Therefore, the PAV is applied in the direction of the first coordinate effect over a discrete set (Step 80). In one or more embodiments of the invention, the least squares distance, or weighted least squares, etc. is used as the optimization criterion.

For example, referring to Equation 1 and Equation 3, the PAV is applied as the least squares distance in the direction of the first coordinate effect, z, such that:

$$(\hat{g}(z) - h_{1,2} - h_{2,3}^{(0)}(z))^2, \quad (9)$$

where z is a discrete set over which the least squares distance is applied. Further, z spans all cache configurations of interest. Thus, applying the PAV over all the values of z minimizes the distance between the unconstrained additive model and the isotonic additive model.

The next target coordinate effect is computed (Step 82) and the PAV is applied in the direction of the next coordinate effect (Step 84). In the present example, the PAV is applied in the direction of the next coordinate effect, z, of the Equation 3 such that, $$(\hat{g}(z) - h_{1,2} - h_{2,3}^{(0)}(z))^2. \quad (10)$$

If there are any coordinate effects remaining (Step 86), the next target additive coordinate effect is computed. Therefore, in the present example, the PAV is applied to the direction of the last coordinate effect, z, of Equation 3, such that, $$(\hat{g}(z) - h_{1,2} - h_{2,3}^{(0)}(z))^2. \quad (11)$$

The application of the PAV to Equation 3, shown in Equations 9–11, may be expressed generally in the following Equation 12:

$$h_{1,2}^{(1)} = Iso\left\{\hat{g}_{1,2}(x_1, x_2) + \frac{\sum_{x_3} \hat{g}_{2,3}(x_2, x_3)}{\#x_3} - \frac{\sum_{x_3} h_{2,3}(x_2, x_3)}{\#x_3} \mid x_1, x_2\right\} = \arg\min_{h_{1,2}} \sum_{i=1}^{3}(\hat{g}(z_i) - h_{1,2} - h_{2,3}^{i-1}(z_i))^2. \quad (12)$$

Referring back to Step 86 of FIG. 6, otherwise, if there are not any coordinate effects remaining, then, if the criterion converges (Step 88), the first additive component is isotonized. Otherwise, if the criterion does not converge (Step 88), then the PAV is applied again in the direction of the first coordinate effect (Step 80).

In one or more embodiments of the invention, applying the isotonzing algorithm to an unconstrained additive model to obtain an isotonic additive model introduces "flat spots", i.e., regions within the isotonic additive model that are flat with respect to one or more dimensions. As a simple example consider that a closest isotonic match to {5,4,3,4} is {5, 4, 3.5, 3.5}, with the closest isotonic match having a flat spot on the right side (i.e., {..., 3.5, 3.5}).

While the introduction of "flat spots" may be satisfactory in some instances, there may be other instances where a computer designer may determine that allowing a greater overall distance between the unconstrained additive model and the isotonic additive model to achieve a closer relative fit locally is of importance. In this case, the computer designer would attempt to remove or minimize the number of "flat spots" in the isotonic additive model.

Referring back to FIG. 4, after isotonizing the unconstrained additive model in Step 58, a smoothing algorithm is applied to reduce the "flat spots" of the isotonic additive model (Step 60). Equation 4 shows the result of the smoothing algorithm, in which isonotizing may be applied further, as follows:

$$\hat{h} \rightarrow \hat{g}^{(1)} \quad (13),$$

where superscript (1) represents the first iteration of smoothing.

The isotonizing and smoothing algorithm may be applied iteratively until the computer designer is satisfied with the isotonic additive model. For example, the following set of equations are generated as the isotonizing and smoothing algorithms are alternately applied:

$$\hat{g}^{(1)} \rightarrow \hat{h}^{(1)} \quad (13.1),$$

$$\hat{h}^{(1)} \rightarrow \hat{g}^{(2)} \quad (13.),$$

$$\hat{g}^{(2)} \rightarrow \hat{h}^{(2)} \quad (13.3).$$

Thus, the smoothed unconstrained additive model and the new isotonic additive model in Equation 13.1, is smoothed and produces the second (denoted by superscript (2)) smoothed unconstrained additive model in Equation 13.2. As noted above the process proceeds until the computer designer is satisfied with isotonic additive model. Typically, the computer designer will be satisfied with the isotonic additive model, after applying the smoothing algorithm, if the resulting isotonic additive model has fewer "flat spots" and that the smoothing algorithm has not altered the fit of the isotonic additive model in other regions, where the smoothing algorithm was not applied. In this manner, the isotonic additive model is generated that models the cache architectural components and miss rates. One skilled in the art can appreciate all the equations previously discussed and described, are provided as exemplary equations and may be represented and computed in a number of ways.

In one or more embodiments of the invention additional terms may be added (i.e., interpretability components) to the final isotonic additive model to make the final isotonic additive model interpretable without changing the overall final isotonic additive model. From example, equation (14) may represent the final additive isotonic additive model.

$$\hat{h}(x_1,x_2,x_3) = \hat{h}_{1,2}(x_1,x_2) + \hat{h}_{2,3}(x_2,x_3) \quad (14)$$

In this case, to make the interaction term (i.e., $x_2$) interpretable and still maintain the overall functional form of the final isotonic additive model a function "$a(x_1)$" may be added to one additive component (e.g., $\hat{h}_{1,2}(x_1,x_2)+a(x_2)$), and subtracted from a second additive component (e.g., $h_{2,3}(x_2,x_3)+a(x_2)$). The subscript "i" is used to denote the interaction term that is common to the isotonic additive components in question. In the above example, the interaction term common to the isotonic additive components in question is denoted by the number 2. The function $a(x_2)$ is chosen by determining $\hat{h}_{1,2}(x_1,x_2)+a(x_2)$, and $\hat{h}_{2,3}(x_2,x_3)+a(x_2)$, such that they are as close as possible to $\hat{g}_{1,2}(x_1,x_2)$, and $\hat{g}_{2,3}(x_2, x_3)$ respectively. It is clear that the overall functional form of the final isotonic additive model is not changed as the function $a(x_2)$ is added and subtracted within the isotonic additive model.

In one embodiment of the invention, determining $a(x_2)$ is treated as a simple optimization problem which may be solved using LaGrange multipliers. Those skilled in the art will appreciate that while only one method for determining $a(x_2)$ is described there are numerous methods available to determine $a(x_2)$.

The isotonic additive model generated in FIG. 4, is then typically used as an input into a system model. The system model defines the system configuration of interest, including cache architecture, number of processors, etc. The system model uses the isotonic additive model to characterize the chosen cache architecture in the system model, i.e., the isotonic additive model provides a accurate estimate of how the particular cache architecture configuration would perform in the system model. The results from the system model may be used to generate graphs, tables, charts, etc. to formulate analysis of the system performance using the particular cache architecture.

Advantages of the embodiments of the invention may include one or more of the following. The invention allows for cache architectural components and miss rates to be modeled as an isotonic additive model. The invention allows a variety of model selection techniques. The invention allows for an isotonic additive model, where the flat steps have been smoothed. The invention allows for isotonizing to be used for finding smooth models of explanatory variables. The invention provides an isotonic additive model that is interpretable for high order models. The invention provides for a variety of optimization criterion. The invention uses pool-adjacent violators algorithm that efficiently generates the appropriate isotonic additive model. One skilled in the art can appreciate that the invention may include other advantages and features.

While the invention has been described with respect to a limited number of embodiments, one skilled in the art, having benefit of this disclosure, can appreciate that other embodiments can be devised which do not depart from the scope of the invention as disclosed herein. Accordingly, the scope of the invention should be limited only by the attached claims.

What is claimed is:

1. A method for modeling a system configuration, comprising:
   isotonizing an unconstrained additive model of a cache architecture to obtain an isonotic additive model for the cache architecture, wherein the isotonic addictive model is of the same functional form as the unconstrained additive model;
   smoothing the isotonic additive model using a flat spot technique to obtain a characterization of the cache architecture; and
   modeling a system configuration using the characterization of the cache architecture.

2. The method of claim 1, further comprising:
adding a plurality of interpretability components to the characterization of the cache architecture, wherein the plurality of interpretability components and the characterization of the cache architecture are used in modeling the system configuration.

3. The method of claim 1, wherein isotonizing comprises:
obtaining a first target additive component in the unconstrained additive model;
isotonizing the first target additive component to obtain a first isotonized additive component;
obtaining a second target additive component from the unconstrained additive model and the first isotonized additive component; and
isotonizing the second target additive component to obtain a second isotonized additive component.

4. The method of claim 3, wherein isotonizing uses a pool-adjacent violators algorithm.

5. The method of claim 4, wherein the pool-adjacent violators algorithm uses a least squares distance as an optimization criterion.

6. The method of claim 4, wherein the pool-adjacent violators algorithm uses a weighted least squares as an optimization criterion.

7. The method of claim 3, wherein isotonizing further comprises:
computing a first target coordinate effect for the first target additive component;
applying a pool-adjacent violators algorithm in a direction of the first target coordinate effect for the first target additive component; and
applying the pool-adjacent violators algorithm in a direction of a second target coordinate.

8. A computer-readable medium having recorded thereon instructions executable by a processor to perform a cache architecture simulation, the instructions for:
isotonizing an unconstrained additive model of a cache architecture to obtain an isotonic additive model for the cache architecture, wherein the isotonic additive model is of the same functional form as the unconstrained additive model;
smoothing the isotonic additive model using a flat spot technique to obtain a characterization of the cache architecture; and
modeling a system configuration using the characterization of the cache architecture.

9. The computer-readable medium of claim 8, further comprising instructions for:
adding a plurality of interpretability components to the characterization of the cache architecture, wherein the plurality of interpretability components and the characterization of the cache architecture are used in modeling the system configuration.

10. The computer-readable medium of claim 8, further comprising instructions for:
obtaining a first target additive component in the unconstrained additive model;
isotonizing the first target additive component to obtain a first isotonized additive component;
obtaining a second target additive component from the unconstrained additive model and the first isotonized additive component; and
isotonizing the second target additive component to obtain a second isotonized additive component.

11. The computer-readable medium of claim 10, wherein isotonizing uses a pool-adjacent violators algorithm.

12. The computer-readable medium of claim 11, wherein the pool-adjacent violators algorithm uses a least squares distance as an optimization criterion.

13. The computer-readable medium of claim 10, further comprising instructions for:
computing a first target coordinate effect for the first target additive component;
applying a pool-adjacent violators algorithm in a direction of the first target coordinate effect for the first target additive component; and
applying the pool-adjacent violators algorithm in a direction of a second target coordinate.

14. A computer system for cache architecture simulation, comprising:
a processor;
a memory;
a display device; and
software instructions stored in the memory for enabling the computer system under control of the processor, to perform:
isotonizing an unconstrained additive model of a cache architecture to obtain an isotonic additive model for the cache architecture, wherein the isotonic additive model is of the same functional form as the unconstrained additive model;
smoothing the isotonic additive model using a flat spot technique to obtain a characterization of the cache architecture; and
modeling a system configuration using the characterization of the cache architecture.

15. The computer system of claim 14, further comprising instructions for: adding a plurality of interpretability components to the characterization of the cache architecture, wherein the plurality of interpretability components and the characterization of the cache architecture are used in modeling the system configuration.

16. The computer system of claim 14, further comprising instructions for:
obtaining a first target additive component in the unconstrained additive model;
isotonizing the first target additive component to obtain a first isotonized additive component;
obtaining a second target additive component from the unconstrained additive model and the first isotonized additive component; and
isotonizing the second target additive component to obtain a second isotonized additive component.

17. The computer system of claim 16, wherein isotonizing uses a pool adjacent violators algorithm.

18. The computer system of claim 17, wherein pool-adjacent violators algorithm uses a least squares distance as an optimization criterion.

19. The computer system of claim 17, wherein pool-adjacent violators algorithm uses a weighted least squares as an optimization criterion.

20. The computer system of claim 16, further comprising instructions for:
computing a first target coordinate effect for the first target additive component;
applying a pool-adjacent violators algorithm in a direction of the first target coordinate effect for the first target additive component; and
applying the pool-adjacent violators algorithm in a direction of a second target coordinate.

* * * * *